May 19, 1942.　　E. JEDRZYKOWSKI　　2,283,370
INTERNAL COMBUSTION ENGINE
Filed Oct. 9, 1940　　3 Sheets-Sheet 1
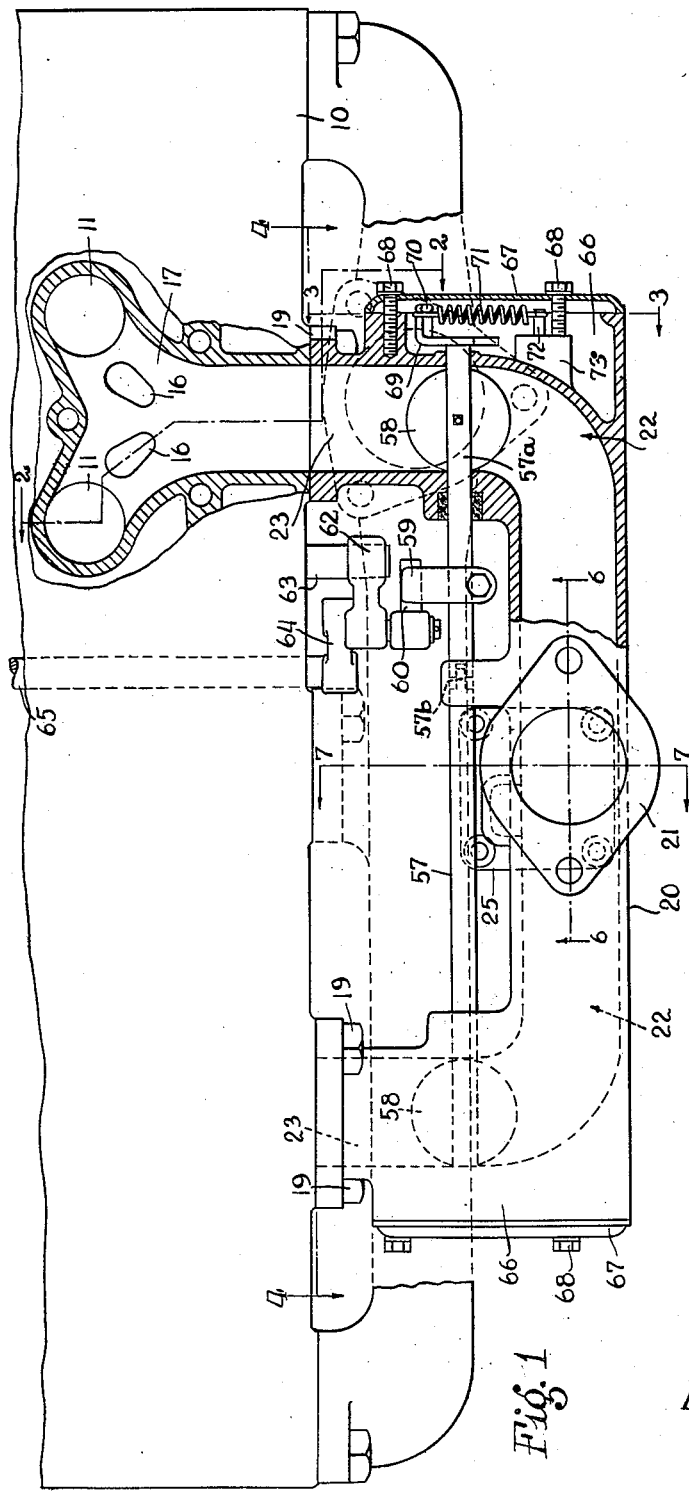
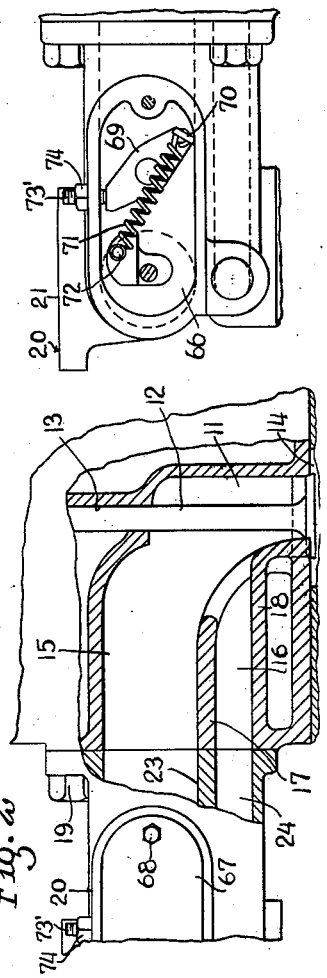
Inventor
Edmund Jedrzykowski
By Paul O. Pippel
Atty.

May 19, 1942.    E. JEDRZYKOWSKI    2,283,370
INTERNAL COMBUSTION ENGINE
Filed Oct. 9, 1940    3 Sheets-Sheet 2

Inventor
Edmund Jedrzykowski
By Paul O. Pippel
Atty.

Inventor
Edmund Jedrzykowski,
By Paul O. Pippel
Atty

Patented May 19, 1942

2,283,370

UNITED STATES PATENT OFFICE 2,283,370

INTERNAL COMBUSTION ENGINE

Edmund Jedrzykowski, Chicago, Ill., assignor to International Harvester Company, a corporation of New Jersey Application October 9, 1940, Serial No. 360,448

11 Claims. (Cl. 123—180)

This invention relates to an internal combustion engine, and more particularly to a starting system for a Diesel engine having a combination manifold for supplying the engine with either air or volatile mixture.

An important object of the invention is to provide a volatile mixture starting system in which the intake manifold includes air and mixture passages, the air passages being provided with shut-off valves adapted to close off said passages while leaving the mixture passages open to the engine.

Another important object is the provision of a manifold having a single air intake branch and a plurality of air outlet branches to the engine, shut-off valves being disposed in the manifold respectively at opposite sides of the air intake branch so that air may be taken in through said intake, but may be cut off from the engine and by-passed through a liquid fuel carburetor for the purpose of operating the engine on volatile mixture.

Another important object is to provide the cylinder head or block of the engine adjacent a combustion chamber with an inlet valve structure comprising a mixture passage and an air passage lying closely adjacent and communicating with the intake valve opening.

Another important object is to provide the manifold with an air outlet communicating with the air inlet of a liquid fuel carburetor mounted adjacent or carried by the manifold.

Another object is to provide in the mixture outlet from the carburetor a valve adapted to close off said outlet when the engine is operating on Diesel fuel with the main air inlet open.

Another object is to provide the manifold with self-contained shut-off valves and to provide operating mechanism for simultaneously operating said valves.

Other objects and important features will become apparent as the disclosure is more fully made.

In the drawings:

Figure 1 is a plan view of a preferred form of manifold structure as mounted on an engine, a portion of the structure being broken away to illustrate certain passages therein;

Figure 2 is a transverse sectional view of a portion of the structure shown in Figure 1 taken on the line 2—2 of that figure;

Figure 3 is a transverse sectional view taken on the line 3—3 of Figure 1 and showing the locking device for the valve operating mechanism;

Figure 4:
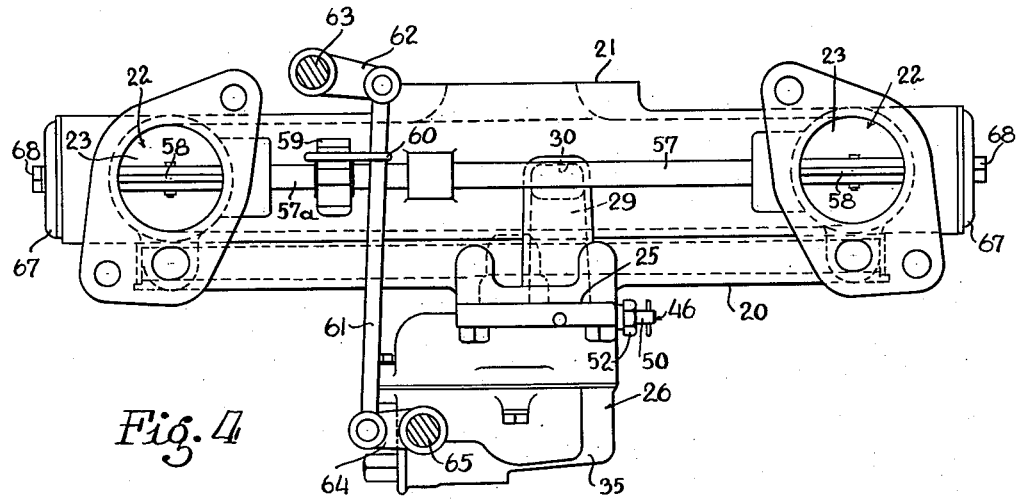
Figure 4 is a longitudinal view of the manifold structure as viewed along the line 4—4 of Figure 1, the view illustrating the manifold independently of the engine.

The engine chosen for the purposes of illustration is a four-cylinder Diesel engine including a cylinder head 10 formed with a plurality of intake valve openings 11. As best shown in Figure 2, each valve opening has associated therewith the usual form of poppet valve 12, the upper portion of the valve stem being slidably carried in a sleeve 13 formed as an integral part of the head structure. The structure provides what is known as a valve-in-head engine. Each inlet opening 11 communicates in the usual manner with a combustion chamber generally designated at 14 in Figure 2.

The head structure is provided at each inlet opening 11 with a pair of adjacent, preferably parallel, inlet passages 15 and 16, the passage 15 being an air inlet passage, and the passage 16 constituting a mixture inlet passage. The passage 16 has a cross-sectional area considerably smaller than that of the passage 15. The passages are separated by a horizontal separating wall 17 which terminates some distance from the valve opening 11. A lower wall portion 18, comprising the bottom wall of the mixture passage 16, extends inwardly beyond the inner wall 17 and terminates at the margin of the valve opening 11. The arrangement is such as to prevent accumulated mixture in the passage 16 from flowing directly into the air passage 15 when the engine is operated on Diesel fuel. The passages 15 and 16 terminate at their outer ends respectively in openings at one side of the engine, these openings being surrounded by finished portions provided with threaded openings adapted to receive bolts 19 for the purpose of securing to the engine a unitary intake manifold structure 20.

Figure 6:
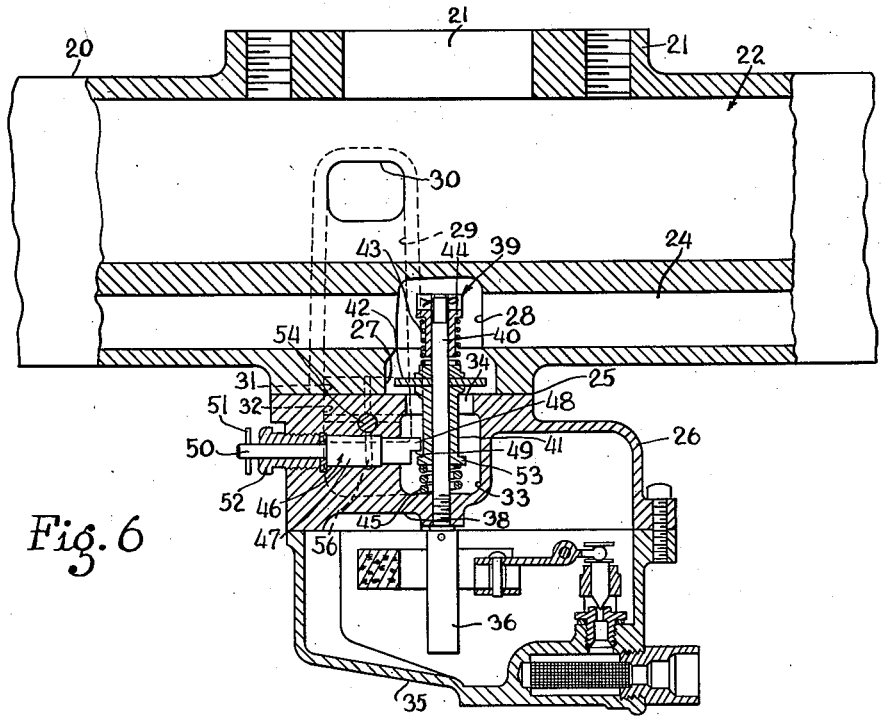
Figure 6 is an enlarged sectional view taken through a portion of the manifold and the attached carburetor, as viewed substantially along the line 6—6 of Figure 1; and, Figure 7 is a transverse sectional view of the structure shown in Figure 6, the view being taken substantially along the line 7—7 of Figure 1.

The manifold consists of a main air intake branch 21 provided with an upper horizontal flange, to which may be secured a conventional form of air cleaner, not shown. The manifold further includes a pair of oppositely extending, horizontal air outlet branches 22, each of which parallels the engine and then turns toward the engine in the vicinity of the respective inlet passages 15 and 16 of the engine. Each of the branches 22 is in the form of a dual outlet branch consisting of an air outlet passage 23 and a mixture outlet passage 24, the latter having a cross-sectional area considerably smaller than that of the former, the passages 23 and 24 thus conforming to the respective sizes of the inlet passages 15 and 16 in the cylinder head 10 of the engine. The outlet passages 23 are in direct communication with the main air intake 21, as best shown in Figure 6. The mixture passages 24 do not communicate directly with the air intake branch.

Figure 5:
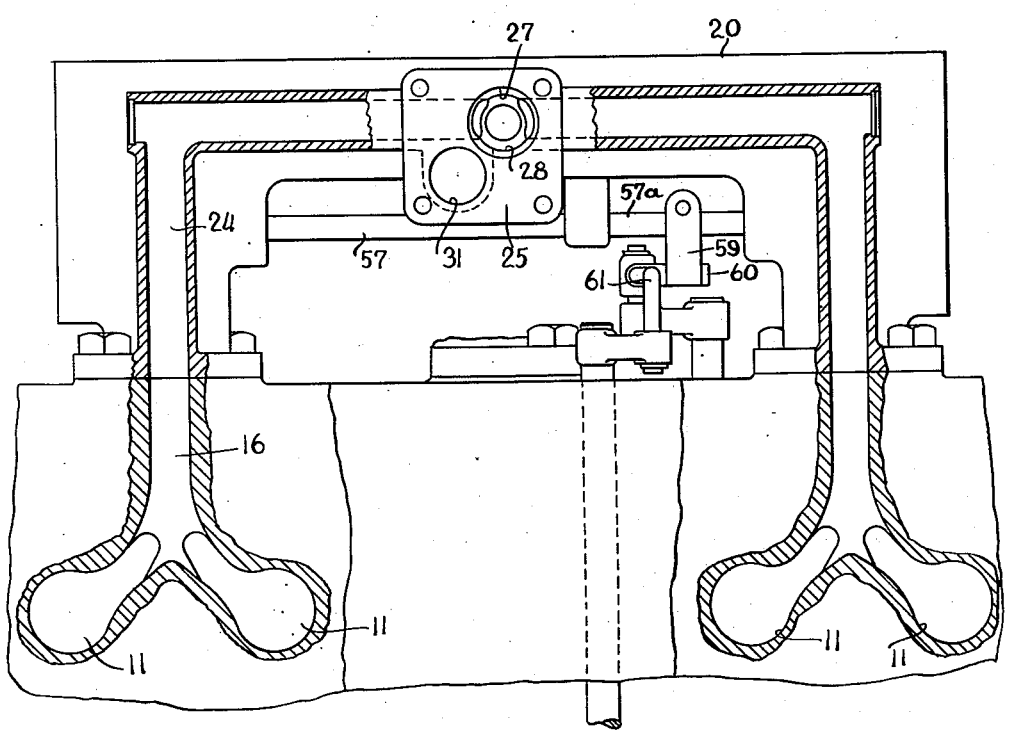
Figure 5 is a sectional view taken through the lower portion of the manifold, as viewed from the under side of the assembly.
Figure 7:
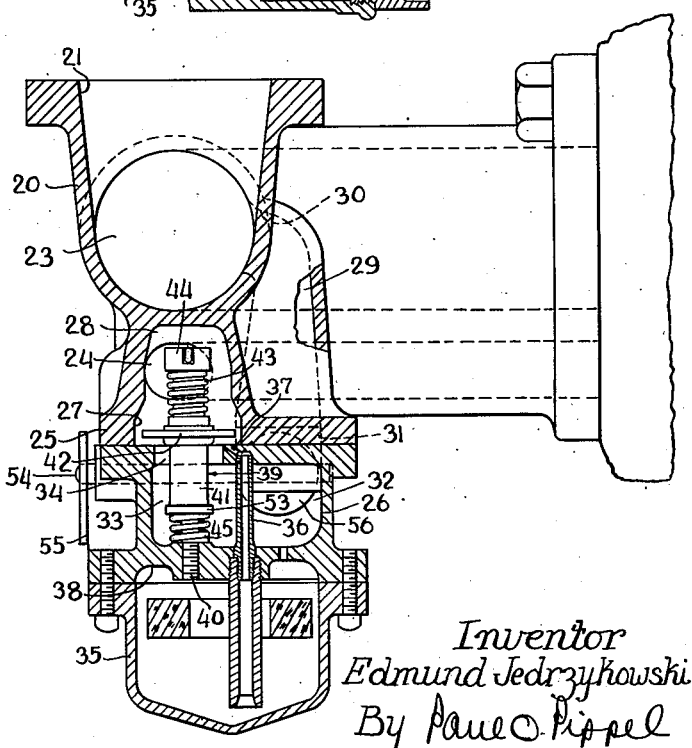

As best shown in Figure 7, the intermediate portion of the manifold 20, just below the main air intake branch 21, is enlarged and provided with a horizontal, flanged portion 25, the portions being finished and adapted to mount a liquid fuel carburetor 26. This lower portion of the manifold is provided with an opening 27 forming part of a smaller chamber 28, which communicates at the center of the manifold with the oppositely extending mixture passages 24. There is no direct communication between the opening 27 and the main air intake branch 21. The manifold is further provided at its central portion with a vertically extending conduit 29, this conduit being separated from the mixture passages 24 and opening at its upper end through an opening 30 to one side of the main air intake branch 21, as shown in Figures 6 and 7. The lower portion of the conduit 29 terminates in an opening 31 in the lower flanged portion 25 of the carburetor-supporting portion of the manifold 20. The locations of the openings 27 and 31 are illustrated in Figure 5.

As best shown in Figures 6 and 7, the carburetor 26 includes the usual air inlet passage 32, communicating in this instance with the opening 31. The carburetor further includes a conventional form of mixture outlet passage 33 communicating through an opening 34 in an upper transverse wall of the carburetor with the opening 27 and thence to the mixture passages 24. The carburetor further includes the usual fuel bowl structure 35, from which extends a jet 36 communicating through an orifice 37 with the opening 27 in the manifold. The portion of the carburetor above the fuel bowl is provided with a transverse wall 38 which carries the jet 36 and which further carries the lower end of a spring- and vacuum-operated valve 39. This valve consists of a vertically extending rod 40 threaded at its lower end into the transverse wall 38 of the carburetor. This rod serves to carry a slidable valve body 41 including a flat, circular portion or disk 42 adapted to close the opening 34 in the upper transverse wall of the carburetor. The disk 42 is sufficiently large to overlie the orifice 37 communicating with the fuel jet 36. The upper end of the rod 40 is provided with a coil spring 43 abutting a head 44 on the rod. The spring 43 is under compression and normally operates to close the valve 42 over the opening 34 and the orifice 37. A balance spring 45 encircles the rod 40 below the valve body 41.

As best shown in Figure 6, a side portion of the carburetor 26 rotatably carries a valve operating assembly 46, consisting of a circular body 47 having an end portion 48, part of which is cut away to provide a cam 49. The other end of the part 47 takes the form of a rod 50, through which is passed a pin 51 to provide an operating handle. The rod portion 50 is encircled by a threaded member 52 threaded into the carburetor body. The cam portion 49 at the inner end 48 of the valve-operating assembly 46 is positioned so that it may engage a circular flange 53 formed at the lower end of the valve body 39. Rotation of the rod 50 will, of course, cause simultaneous rotation of the cam 49, with the result that portions of the cam may engage the flange 53 on the valve body 41 for regulating the amount of the opening of the valve disk 42, providing in effect a throttle valve controlling the mixture outlet opening 34, which communicates with the mixture outlet passages 24 to the cylinder head or combustion chamber.

The carburetor further carries a transverse rock-shaft 54 provided at its outer end with an operating lever 55 and carrying on an inner portion thereof a conventional butterfly valve 56 disposed in the inlet passage 32 of the carburetor and adapted to open or close said passage to a supply of air through the conduit 29 from the main air intake branch 21 of the manifold, providing a conventional choke valve.

As best shown in Figure 1, a rock-shaft, comprising two shaft parts 57 and 57a, parallels the longitudinal portion of the manifold 20 and is journaled in the manifold branches 22, extending at opposite ends respectively into the air outlet passages 23. The shaft parts are interconnected at 57b for conjoint rotation. The two valves 58, of the butterfly type, are mounted on the shaft respectively within the air outlet passages 23. Intermediate its ends, the rock-shaft carries an operating arm 59, which is connected by a member 60 to a vertical link 61. The upper end of the link is pivotally connected to an arm 62 connected to a rock-shaft 63 extending transversely of the engine 10, this rock-shaft comprising part of the conventional shifting mechanism for shifting the engine operation from volatile mixture to Diesel. The lower end of the link 61 is pivotally connected to an arm 64 carried on a transverse rock-shaft 65 forming an additional part of the shifting mechanism. The shifting mechanism is referred to but generally, since it forms no part of the present invention except in so far as it is connected to the operating shaft 57a for the butterfly valves 58.

The shaft parts 57 and 57a extend at opposite ends through the respective outlet passage 23 and through the end wall of the manifold into a chamber or housing 66, which housing forms an integral part of the manifold. A similar housing is provided at each end of the manifold, and, since the two are identical, only one will be described. The detail construction of the housing is shown in the broken-away portion of Figure 1 at the right-hand side thereof. The housing consists of wall portions of the manifold which are enclosed by a cover 67 secured by bolts 68. Inside the housing, the end of the shaft 57 carries rigidly thereon an arm 69 having one end bent over to provide an attaching portion 70 to which is secured one end of a tension spring 71. The other end of the spring 71 is attached to a stud 72 carried by a boss 73 comprising part of the manifold within the housing 66. The other end of the arm 69 abuts an adjustable stud 73' extending through the top wall of the housing and provided with a lock nut 74. In the ordinary open position of the valves 58, the parts assume the positions shown in Figures 1 and 3. The disposition of the connected ends of the springs 71 with respect to the center of the shaft parts 57 and 57a is such as to provide an over-center lock when the valves are moved to closed position. When the valves are moved to closed position, the shaft rotates in a counter-clockwise direction (as viewed in Figure 3) and again the parts assume an over-center position so that the valves are retained in closed position. A similar structure is provided at the opposite end of the manifold in the other housing or chamber 66.

In the operation of the engine and manifold system, the parts are arranged as shown in the drawings; that is, the parts assume these positions preparatory to starting the engine. The engine is thus started on volatile mixture and operates on that mixture for a sufficient warming-up period. Air taken from the main air intake 21 is drawn through the carburetor air inlet 32 via the conduit 29 between the manifold opening 30 and the carburetor, the air mixing with the liquid fuel from the jet 36 and orifice 37, the mixture then passing through the opening 34 (the valve 42 being held open against its spring pressure by engine vacuum) and through the mixture passages or outlets 24 and into the combustion chambers of the engine through the inlet valve openings 11. During this phase of the operation, the rock-shaft 57 is rotated to close the valves 58, thus shutting off the air outlet passages 23. It will be noted that the passages 24 are considerably smaller in cross-section than the air passages 23; thus a sufficient velocity of mixture is maintained to provide good distribution and to prevent dropping out of appreciable amounts of the fuel which may not be properly vaporized. It will be noted that the mixture passages 16 terminate in closely spaced relation to the valve openings 11 so that the mixture is delivered directly into the inlet openings or ports. When the engine has been put into operation and has warmed up on a volatile mixture, the shaft parts 57 and 57a are rotated by the mechanism, including the linkage 60 and 61, to open the valves 58 for the purpose of admitting larger quantities of air directly to the combustion chambers through the larger air outlet branches 23. At the same time, the engine vacuum to the carburetor drops off so that the valve 42 in the carburetor closes the opening 34 and thus cuts off the supply of mixture. It will also be noted that, because of the position and shape of the mixture passages 16 below the air passages 15, there is no possibility of liquid fuel running back into the air passages 15 and 23 or collecting on the walls thereof. Any liquid fuel which may collect has a tendency to run back into the inlet passages 16 and 24.

From the foregoing description it will be seen that an improved manifold system has been provided for the objects and purposes set forth above. Other objects and features will be apparent to those skilled in the art. It is to be understood that only a preferred embodiment of an improved system has been illustrated and described, and that numerous modifications and alterations may be made therein without departing from the spirit and scope of the invention as defined by the appended claims.

What is claimed is:

1. A gasoline-starting manifold system for Diesel engines comprising a cylinder head formed with two inlet passages, an inlet manifold having two outlet branches communicating with said passages and an air inlet branch, a valve positioned in each of said outlet branches, means for shifting said valves into closed and open positions, a liquid fuel carburetor mounted adjacent said manifold, said carburetor having a passageway formed therein for the inflow of air and the outflow of carbureted mixture, an air inlet conduit connecting the manifold at a point between the valves with the inlet side of the passageway through the carburetor, and an auxiliary carbureted mixture manifold connecting the outlet side of the conduit through the carburetor with each of the passages in the cylinder head for conveying carbureted mixture thereto.

2. A gasoline-starting manifold system for Diesel engines comprising a cylinder head formed with two inlet passages, an air inlet manifold having two outlet branches communicating with said passages and an air inlet branch, a valve positioned in each of said outlet branches, means for shifting said valves into closed and open positions, a liquid fuel carburetor mounted on said manifold, said carburetor having a passageway formed therein for the inflow of air and the outflow of carbureted mixture, an air inlet conduit connecting the manifold at a point between the valves with the inlet side of said passageway, and an auxiliary carbureted mixture manifold integral with the air inlet manifold connecting the outlet side of the passageway through the carburetor with each of the passages in the cylinder head for conveying carbureted mixture thereto.

3. A gasoline-starting manifold system for a Diesel engine having a pair of inlet passages, said system comprising a manifold having an intake and a pair of outlet branches connected respectively with said passages, shut-off means in each branch, means for positioning said shut-off means in open or closed position, a mixture carburetor adjacent the manifold and connected thereto at a point at the intake side of the shut-off means to receive air from the manifold intake, and a mixture conduit connected to the carburetor and including a pair of branches separate from the outlet branches of the manifold and connected to the inlet passages in the engine.

4. A gasoline-starting system for a Diesel engine, in which the engine includes a pair of combustion chambers respectively having inlet passages, said system comprising an inlet manifold having an air intake and a pair of communicating branches connected respectively to the inlet passages in the engine, a carburetor adjacent the manifold having an air inlet conduit connected to the manifold at a point between the branches to receive air from the manifold intake, a mixture conduit separate from the outlet branches of the manifold and connected between the carburetor and the inlet passages in the engine, and means for closing off the manifold branches to the inlet passages in the engine at opposite sides of the air inlet connection between the manifold and the carburetor.

5. A gasoline-starting manifold system for a Diesel engine having a pair of inlet passages, said system comprising a manifold having an intake and a pair of outlet branches connected respectively with said passages, shut-off means in each branch, means for positioning said shut-off means in open or closed position, a mixture carburetor adjacent the manifold and connected thereto at a point at the intake side of the shut-off to receive air from the manifold intake, a mixture conduit separate from the outlet branches of the manifold and connected between the carburetor and the inlet passages in the engine, and means for closing off the mixture conduit when the aforesaid shut-off means are open.

6. In a Diesel engine having a pair of combustion chambers respectively formed with inlet openings, the engine being formed at each opening with an air inlet passage and a mixture inlet passage, both communicating with the respective opening, the mixture passage having a cross-sectional area considerably smaller than that of the inlet passage, a manifold having an air intake and a pair of dual outlet branches, each branch including an air outlet to the respective air inlet passage in the engine and a mixture outlet to the respective mixture passage, the air intake in the manifold communicating directly with said air outlets, a carburetor adjacent the manifold and having an air inlet passage connected to the manifold air intake between the branches and having a mixture outlet communicating with the manifold mixture outlets, and shut-off means carried by the manifold at opposite sides of the connection between the manifold air intake and the carburetor inlet for optionally opening or closing off the manifold air outlet to the engine.

7. In a Diesel engine having a pair of combustion chambers respectively formed with inlet openings, the engine being formed at each opening with an air inlet passage and a mixture inlet passage, both communicating with the respective opening, the mixture passage having a cross-sectional area considerably smaller than that of the inlet passage, a manifold having an air intake and a pair of dual outlet branches, each branch including an air outlet to the respective air inlet passage in the engine and a mixture outlet to the respective mixture passage, the mixture outlet having a cross-sectional area considerably smaller than that of the air outlet, the air intake in the manifold communicating directly with said air outlets, a carburetor adjacent the manifold and having an air inlet passage connected to the manifold air intake between the branches and having a mixture outlet communicating with the manifold mixture outlets, shut-off means carried by the manifold at opposite sides of the connection between the manifold air intake and the carburetor inlet for optionally opening or closing off the manifold air outlet to the engine, and shut-off means in the carburetor mixture outlet.

8. In a Diesel engine having a pair of combustion chambers respectively formed with inlet openings, the engine being formed at each opening with an air inlet passage and a mixture inlet passage, both communicating with the respective opening, the mixture passage having a cross-sectional area considerably smaller than that of the inlet passage, a manifold having an air intake and a pair of dual outlet branches, each branch including an air outlet to the respective air inlet passage in the engine and a mixture outlet to the respective mixture passage, the mixture outlet having a cross-sectional area considerably smaller than that of the air outlet, the air intake in the manifold communicating directly with said air outlets, a carburetor adjacent the manifold and having an air inlet passage connected to the manifold air intake between the branches and having a mixture outlet communicating with the manifold mixture outlets, shut-off means carried by the manifold at opposite sides of the connection between the manifold air intake and the carburetor inlet for optionally opening or closing off the manifold air outlets to the engine, and shut-off means in the carburetor mixture outlet, said means comprising a valve normally yieldably closing said outlet when the first shut-off means are open and responsive to intake suction to open said outlet when the first shut-off means are closed.

9. In a Diesel engine having a pair of combustion chambers respectively having inlet passages, a carburetor having an air inlet and a mixture outlet, the latter being connected to the engine inlet passages, a manifold having an air intake and a pair of connected outlet branches, the latter communicating respectively with the engine inlet passages, an air inlet conduit connecting the air inlet of the carburetor to the manifold at a point between the branches, whereby the carburetor may receive air through the manifold air intake, and a pair of valves disposed in the manifold respectively at opposite sides of the carburetor air inlet connection with the manifold and operable to open or close the outlet branches to direct incoming air to the engine inlet passages either directly through said branches or through the carburetor via the carburetor air inlet and mixture outlet.

10. In a Diesel engine having a pair of combustion chambers respectively having inlet passages, a carburetor having an air inlet and a mixture outlet, the latter being connected to the engine inlet passages, a unitary manifold structure comprising an air intake and a pair of integral dual branches, each branch including separated air and mixture outlets connected to a respective engine inlet passage, the air intake communicating with the air outlets but separated from the mixture outlets, said manifold including at two separated points intermediate the branches first and second openings, the first communicating with the air intake and the second with the mixture outlets, a carburetor carried by the manifold and having an air inlet communicating with the first opening and a mixture outlet communicating with the second opening, a valve mounted to open or close the second opening to the carburetor air inlet, and a pair of valves mounted respectively in the manifold branches in the air outlets and shiftable to open or closed position.

11. In a Diesel engine having a pair of combustion chambers respectively formed with inlet valve openings, the engine being formed at each opening with an air inlet passage and a mixture inlet passage, said passages being parallel and both communicating with the respective valve opening, the mixture passage having a cross-sectional area considerably smaller than that of the inlet passage, a unitary manifold structure having an air intake and a pair of dual outlet branches, each branch including an air outlet to the respective air inlet passage in the engine and a mixture outlet to the respective mixture passage, the mixture outlet having a cross-sectional area considerably smaller than that of the air outlet, the air intake in the manifold communicating directly with said air outlets, a carburetor carried by the manifold and having an air inlet passage connected to the manifold air intake between the outlet branches and having a mixture outlet communicating with the manifold mixture outlets, shut-off means carried by the manifold at opposite sides of the connection between the manifold air intake and the carburetor inlet for optionally opening and closing off the manifold air outlet to the engine, and shut-off means in the carburetor mixture outlet.

EDMUND JEDRZYKOWSKI.